United States Patent
Zhou et al.

(10) Patent No.: US 9,729,635 B2
(45) Date of Patent: *Aug. 8, 2017

(54) TRANSFERRING INFORMATION AMONG DEVICES USING SENSORS

(71) Applicant: Amazon Technologies, Inc., Reno, NV (US)

(72) Inventors: Dong Zhou, San Jose, CA (US); Kenneth Mark Karakotsios, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 287 days.

This patent is subject to a terminal disclaimer.

(21) Appl. No.: 14/603,133

(22) Filed: Jan. 22, 2015

(65) Prior Publication Data

US 2015/0135093 A1 May 14, 2015

Related U.S. Application Data (63) Continuation of application No. 13/552,380, filed on Jul. 18, 2012, now Pat. No. 8,943,582.

(51) Int. Cl.
*H04L 29/08* (2006.01)
*G06F 21/32* (2013.01)
(Continued)

(52) U.S. Cl.
CPC ............ *H04L 67/12* (2013.01); *G06F 3/0486* (2013.01); *G06F 3/0488* (2013.01); *G06F 3/04842* (2013.01); *G06F 21/32* (2013.01)

(58) Field of Classification Search
CPC .. G06F 3/0488; G06F 3/0486; G06F 3/04824; G06F 21/32; H04L 67/12
(Continued)

(56) References Cited

U.S. PATENT DOCUMENTS 8,358,200 B2 * 1/2013 Madhvanath ....... G06F 3/03547
340/5.52
8,943,582 B1 * 1/2015 Zhou ..................... G06F 3/0488
726/19
(Continued)

OTHER PUBLICATIONS

USPTO Notice of Allowance dated Sep. 26, 2014, for U.S. Appl. No. 13/552,380, 7 pages.
(Continued)

*Primary Examiner* — Kambiz Zand
*Assistant Examiner* — Aubrey Wyszynski
(74) *Attorney, Agent, or Firm* — Polsinelli LLP (57) ABSTRACT

Data provided on a first computing device is represented by a graphical object displayed on a screen. A user can initiate an "attach event" with a gesture to enable the graphical object to be associated and/or virtually attached to the user and/or a user's hand/fingers. An image capture component can view/track user movements. Based on the viewed/tracked movements, the graphical object representing the data on the first computing device can be moved on a screen of the first computing device to correspond to the movement of the user's hand/finger. The graphical object also can be moved to a position on a screen of a second computing device when the user moves a hand/fingers to an area corresponding to the position. A user may initiate a "release event" with a gesture and can end the association and enable the data to be sent to the second computing device.

20 Claims, 8 Drawing Sheets

(51) Int. Cl.
*G06F 3/0484* (2013.01)
*G06F 3/0488* (2013.01)
*G06F 3/0486* (2013.01)

(58) Field of Classification Search
USPC .......................................... 726/19; 715/748
See application file for complete search history.

(56) References Cited

U.S. PATENT DOCUMENTS

| | | |
|---|---|---|
| 2009/0210811 A1 | 8/2009 | Saul et al. |
| 2010/0131265 A1 | 5/2010 | Liu et al. |
| 2012/0096368 A1 | 4/2012 | McDowell |
| 2012/0242652 A1 | 9/2012 | Kim |
| 2012/0254793 A1 | 10/2012 | Briand et al. |
| 2012/0278727 A1* | 11/2012 | Ananthakrishnan .. G06F 3/0486 715/748 |
| 2013/0201139 A1 | 8/2013 | Tanaka |

OTHER PUBLICATIONS

USPTO Non-Final Office Action dated Mar. 24, 2014, for U.S. Appl. No. 13/552,380, 13 pages.

* cited by examiner

FIG. 7 ously write some text, attach the file to be transferred, and then send the e-mail. As such, conventional approaches can often times seem tedious, slow, and boring. There is a need for an interactive, convenient, and intuitive approach to data transfer.

TRANSFERRING INFORMATION AMONG DEVICES USING SENSORS

CROSS-REFERENCE TO RELATED APPLICATIONS

This application is a Continuation of U.S. patent application Ser. No. 13/552,380, entitled "TRANSFERRING INFORMATION AMONG DEVICES USING CAMERAS," filed with the U.S. Patent and Trademark Office on Jul. 18, 2012, which is incorporated herein by reference for all purposes.

BACKGROUND

Computing devices are often used to transfer data among one another. Conventional approaches often require numerous mundane steps to achieve data transfer. For example, to transfer a file to someone right next to a user, the user has to plug in a thumb/flash/USB drive into his/her computing device, copy the file to be transferred, and give the thumb/flash/USB drive to the other person. Then the drive has to be plugged into the other person's computing device and the file has to be copied over. In another example, a user can decide to use e-mail to transfer a file to a recipient. The user has to open an e-mail application (or a web browser for webmail), create a new e-mail message, type in an e-mail address, optionally write a subject, optionally write some text, attach the file to be transferred, and then send the e-mail. As such, conventional approaches can often times seem tedious, slow, and boring. There is a need for an interactive, convenient, and intuitive approach to data transfer.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to data sharing and/or data transfer. In particular, various embodiments can provide an interactive, convenient, and intuitive approach to data transfer. Data on a first computing device can be represented by a graphical object displayed on a screen of the first computing device. A user can initiate an "attach event" (such as a pinching gesture with respect to the graphical object) to enable the graphical object (e.g., the data on the first computing device) to be associated and/or virtually attached to him/her and/or to his/her hand/finger(s). One or more image capture components can view/track user movement (e.g., hand/finger movement). Based at least in part upon the viewed/tracked movement, a graphical object representing the data on the first computing device can be moved on a screen of the first computing device to correspond to the movement of the user's hand/finger. The graphical object can also be moved to a position on a screen of a second computing device when the user moves his/her hand/finger(s) to an area corresponding to the position. The user can initiate a "release event" (such as an unpinching gesture with respect to the graphical object) to enable the data associated and/or attached to the user to be transferred/sent to the second computing device. The release event can also end the association between the user and the graphical object representing the data.

In some embodiments, an attach event can be a pinching and/or tapping of the graphical object on the screen of the first computing device. For example, a user can pinch his/her fingers together on the graphical object and/or tap the graphical object on the screen using one or more of his/her fingers. The attach event can be viewable/detectable by a first image capture component (e.g., camera) on the first computing device. In some embodiments, a touch sensor/screen can replace or work in conjunction with the first image capture component to detect the attach event. In some embodiments, the touch sensor/screen can be a sensor/screen utilizing capacitive hovering technology (e.g., can detect fingertip presence when fingertip is not physically touching the sensor/screen) and optionally utilizing optics (e.g., panchromatic camera, infrared camera, etc.).

In some embodiments, the attach event can include performing at least one of a pinching gesture, a tapping gesture, a pressing gesture, a grabbing gesture, or a pointing gesture, with respect to the graphical object and in conjunction with at least one of the camera or the touch sensor. Upon the attach event, the graphical object can be (virtually) attached to the user's finger(s) such that movement of the finger(s) can cause the graphical object to move on the screen correspondingly.

The user can "move" the graphical object from the screen of the first computing device to a screen on a second computing device. In some embodiments, upon determining that the user's hand with the graphical object (and the data) attached is moving from the first computing device to the second computing device, the first computing device can send a signal to notify the second device (e.g., using short-range communication, using network/cloud communication, etc.). In some embodiments, for example, in order to indicate a destination device (e.g., the second computing device) to which the graphical object (and content associated with the graphical object) should be moved, the user can initiate a release event with respect to that device (e.g., the second computing device). Upon detecting the release event on the second computing device, determining that the object is able to be transferred/sent to that device, and/or successfully completing the transfer, the association of the object with the user can be ended and the content transferred/sent, copied, and/or shared to the second device. In some embodiments, the release event can be an unpinching of the graphical object (e.g., separation of the pinched fingers) and/or tapping on the screen of the second computing device. Similar to the attach event, the release event can be viewable/detectable by a second image capture component (e.g., camera) on the second computing device. A touch sensor (e.g., touch screen) on the second computing device can also replace or work in conjunction with the first image capture component to detect the attach event. Upon the release event, the association between the graphical object and the user (e.g., user's fingers) ends and the data represented by the graphical object is transferred from the first computing device to the second computing device.

Various embodiments attempt to provide a virtual "clipboard" for data transfer. An attach event can enable data to be associated or virtually attached to the user. A release event can enable the data to be transferred. The disclosed technology allows for the user to be a virtual clipboard for "copying and pasting" and/or "dragging and dropping" data from the first computing device to the second computing device. In some embodiments, data can be copied/cut and pasted, dragged and dropped, etc. from the first computing device to multiple computing devices external to the first computing device. For example, data can be shared by the first computing device with the second computing device, with a third computing device, and/or with a fourth computing device, etc.

Figure 1:
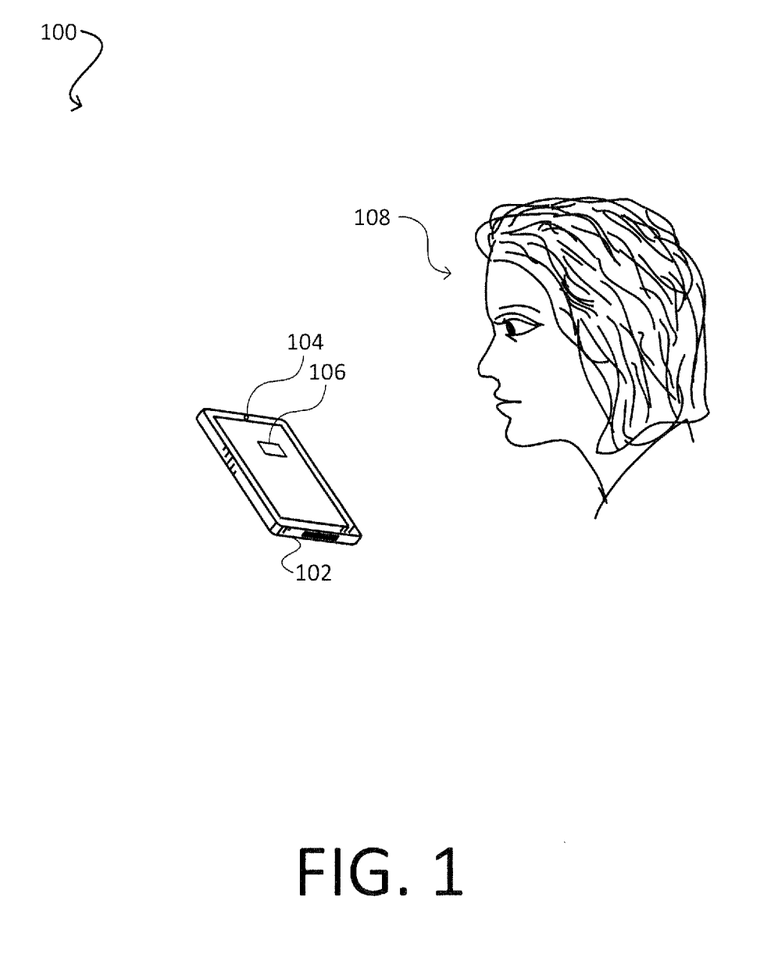
FIG. 1 illustrates an example environment in which aspects of the various embodiments can be utilized.

FIG. 1 illustrates an example environment in which aspects of the various embodiments can be utilized. The example environment 100 can comprise a computing device 102, at least one image capture component 104, and a graphical object 106 representing data on the computing device 102. A user 108 of the computing device 102 may wish to transfer the data, for example, to another computing device. For example, the user 108 may wish to transfer a word processing document (e.g., data represented by graphical object 106) from his/her laptop (e.g., computing device 102) to another computing device such as his/her desktop, smart phone, and/or another user's computer.

The data represented by the graphical object 106 can be any information capable of being stored on the computing device 102. The data can be, for example, contact information (e.g., vCard), a media file (e.g., music, image, video, e-book), a document (e.g., word processing document, spread sheet, slide show presentation), software (e.g., apps, games, operating system file, firmware, update file), or any other various data objects or information capable of being stored on the computing device 102. The graphical object 106 can be any icon, mark, or visual capable of being displayed on a display screen of the first computing device 102.

Figure 2A:
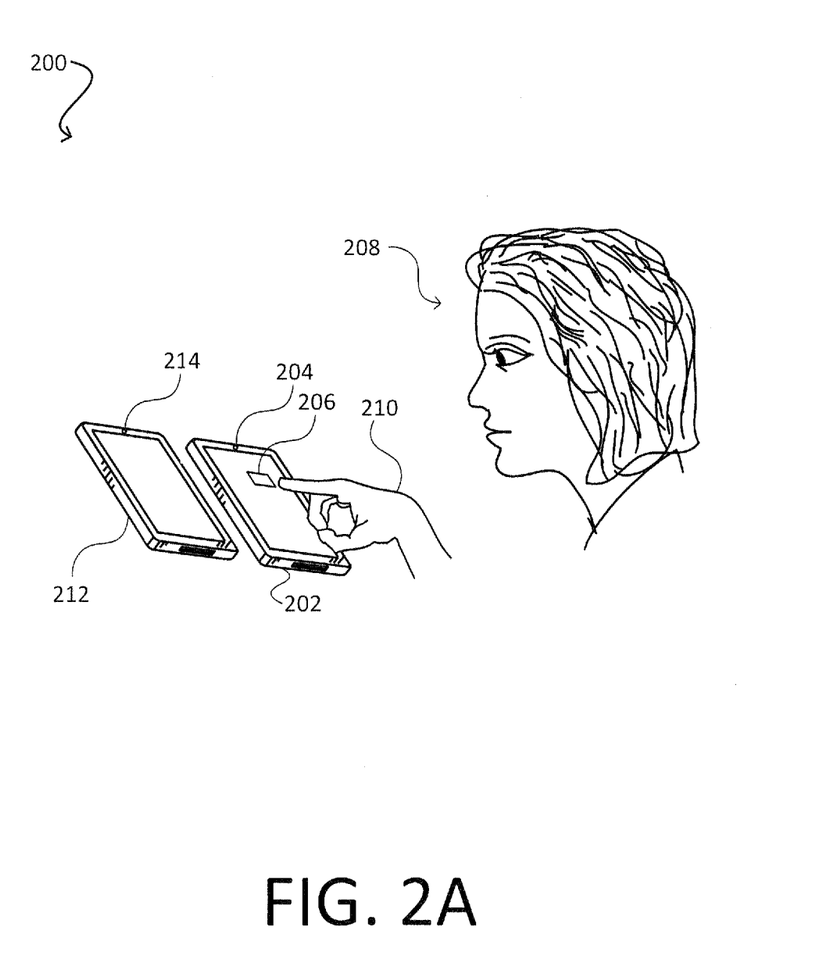
FIG. 2A illustrates an example system embodiment for transferring information among devices using cameras.

FIG. 2A illustrates an example system embodiment 200 for transferring information among devices using cameras. The example system embodiment 200 can comprise a first computing device 202, at least one first image capture component 204 on the first computing device 202, data 206 on the first computing device 202 to be transferred, and a second computing device 212 with at least one second image capture component 214. There can be a user 208 of the first computing device 202 (and/or second computing device 212) with a hand 210. The user 208 can use his/her hand 210 to operate the device. For example, the first and second computing devices 202 and 212 can provide input methods via touch sensors/screens, buttons, etc. for the hand 210 to operate to cause the computing devices to perform certain tasks.

In some embodiments, the at least one first image capture component 204 can be one or more cameras on the first computing device 202. The at least one first image capture component 204 can be capable of viewing at least a portion of the hand 210 of the user 208. Using the at least one first image capture component 204, the position of the portion of the hand 210 can be tracked. The position (e.g., location) of the portion of the hand 210 relative to the first computing device 202 can be determined, for example, via image processing, object recognition, and/or distance calculating algorithms. Moreover, the at least one first image capture component 204 can be used to track movements of the hand 210. By tracking the movements of the hand 210, one or more gestures of the hand 210 can be determined/detected by the first computing device 202, for example, using image processing, image object recognition, and/or gesture detection algorithms.

In some embodiments, the first computing device 202 can also know of or determine the position/location of the graphical object 206 relative to a display screen of the first computing device 202. For example, the first computing device 202 can pre-determine or already have access to information specifying that the graphical object 206 lies on an upper center region of the display screen of the first computing device 202. If the graphical object 206 is moved or shifted, the first computing device can still know of its current position/location.

The first computing device 202 can establish an association between the graphical object 206 and the portion of the hand 210 when an "attach event" occurs. An attach event can occur when the position (e.g., location) of the hand 210 becomes sufficiently close to or in contact with the position (e.g., location) of the graphical object 206 on the screen display of the first computing device 202. For example, based at least in part upon tracking/determining the position of the portion of the user's hand 210 relative to the first computing device 202, the position of the portion of the hand 210 relative to the position of the graphical object 206 on the display screen can be determined. When the portion of the hand 210 comes into sufficiently close proximity with the graphical object 206, the first computing device 202 can establish an association between the graphical object 206 and the portion of the hand 210.

Alternatively or additionally, the first computing device 202 can utilize a touch sensor (e.g., touch screen) to detect an attach event. For example, if the first computing device 202 utilizes the touch sensor/screen and determines that the portion of the hand (210) (e.g., finger) has touched the graphical object 206, an attach event can be detected. In some embodiments, the touch screen can be implemented instead of or in conjunction with the first image capture component 204 to detect attach event.

Figure 2B:
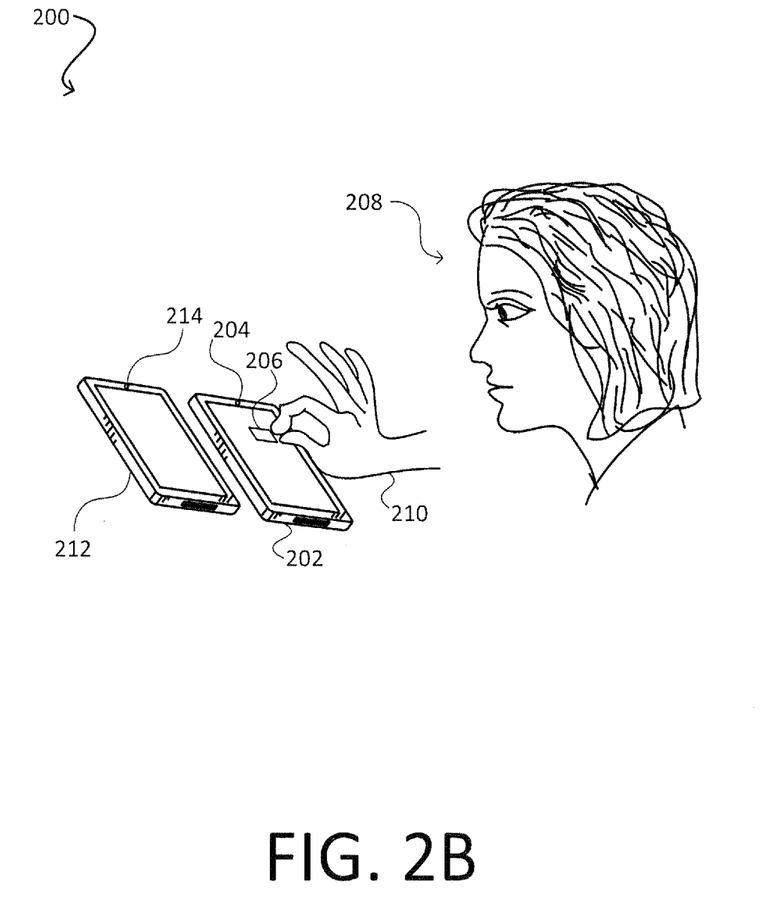
FIG. 2B illustrates an example system embodiment for transferring information among devices using cameras.

In some embodiments, an attach event can be a tapping or touching of the graphical object 206 on the display screen of the first computing device 202, as shown in FIG. 2A. In some embodiments, an attach event occur when the user touches the graphical object on the display screen and presses/holds his/her finger(s) there for a specified amount of time. In some embodiments, an attach event can be a pinching of the graphical object 206 on the display screen of the first computing device 202, as shown in FIG. 2B. In some embodiments, an attach event can be a grabbing, grasping, pointing, or other similar gestures/movements detectable by the first computing device 202 (e.g., via the first image capture component 204 and/or touch sensor/screen).

Figure 2C:
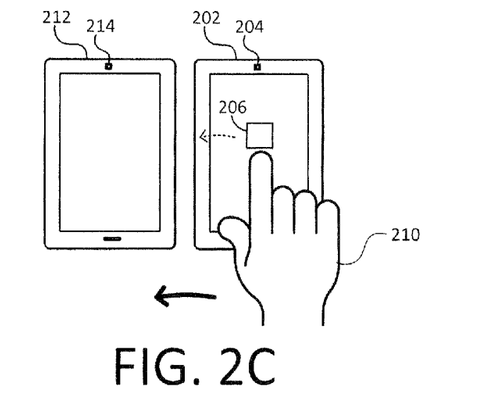
FIG. 2C illustrates a top view of the example system embodiment of FIG. 2A.

FIG. 2C illustrates a top view of the example system embodiment of FIG. 2A. Upon the attach event, the first computing device 202 can establish an association between the graphical object 206 and the portion of the hand 210. For example, if the user 208 taps the graphical object 206 on the display screen with his/her finger (e.g., as illustrated in FIGS. 2A and 2C), then the attach event can be detected by one or more cameras 204 (and/or by the display screen if it is a touch sensor/screen) on the first computing device 202 and the graphical object 206 can be associated with the fingertip of the user 208. In another example, if the user 208 pinches the graphical object 206 on the display screen with his/her index finger and thumb (e.g., as illustrated in FIG. 2B), then the attach event can be detect by the camera 204 (and/or touch sensor/screen) and the graphical object 206 can be associated with the user's index finger and thumb pinched together.

During the association, the first image capture component 204 can be used to track the position (e.g., location) of the portion of the hand 210 of the user 208. Based on the position of the portion of the hand 210, the first computing device 202 can move the graphical object 206 on the display screen of the first computing device 202 to correspond to the position of the portion of the hand 210. In other words, a movement of the portion of the hand 210 can cause the graphical object 206 to move correspondingly on the display screen of the first computing device 202.

Similarly, during the association, the second image capture component 214 (e.g., one or more cameras) on the second computing device 212 can be used to track the position (e.g., location) of the portion of the hand 210 of the user 208. Based on the position of the portion of the hand 210, the second computing device 212 can also (generate and) move the graphical object 206 on a display screen of the second computing device 212 to correspond to the position of the portion of the hand 210. In other words, a movement of the portion of the hand 210 can cause the graphical object 206 to (be generated on the display screen of the second computing device 212 and) move correspondingly on the display screen of the second computing device 212.

Figure 2D:
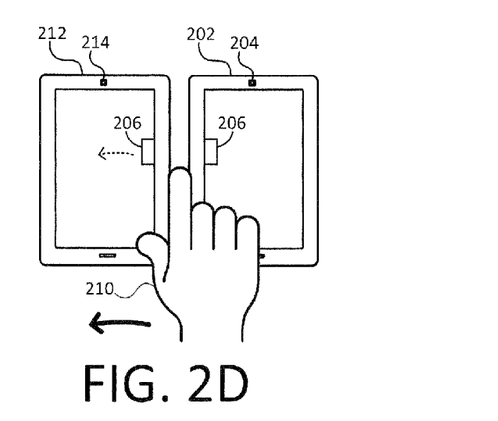
FIG. 2D illustrates a top view of the example system embodiment of FIG. 2A.

FIG. 2D illustrates a top view of the example system embodiment of FIG. 2A. In some embodiments, the user 208 can move his/her hand 210 to cause the graphical object 206 to move off the display screen of the first computing device 202, as shown in FIG. 2D. The user 208 can also move his/her hand 210 into an area sufficiently close to the second computing device 212 such that the graphical object 206 is generated and moved onto the display screen of the second computing device 212.

Figure 2E:
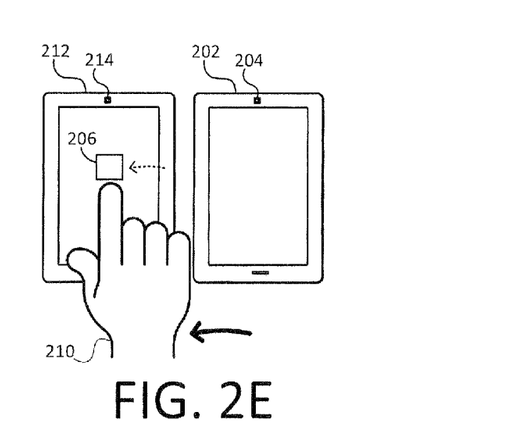
FIG. 2E illustrates a top view of the example system embodiment of FIG. 2A.

FIG. 2E illustrates a top view of the example system embodiment of FIG. 2A. FIG. 2E shows the user 208 having moved his/her hand 210 in a leftward direction during the association, such that the graphical object 206 has moved correspondingly from the display screen of the first computing device 202 to that of the second computing device 212. It is contemplated that there can be various relative positions and configurations for the first and second computing devices. For example, the first computing device 202 can be on the left side of the second computing 212 such that the user has to move his/her hand 210 in a rightward direction during association to cause the graphical object 206 to move from the display screen of the first computing device 202 to that of the second computing device 212.

After moving the graphical object 206 onto the display screen of the second computing device 212, the user 208 can enable the association between the graphical object 206 and the portion of his/her hand 210 to end via a "release event." In some embodiments, a release event can be a tapping or touching of the graphical object 206 moved onto the display screen of the second computing device 212, as shown in FIG. 2E. In some embodiments, a release event can be a release of pinched fingers of the user. For example, if the attach event is a pinching of the user's fingers, the release event can be the separation of the pinched fingers. In some embodiments, the separation of the fingers can occur on a touch sensor (e.g., touch screen display) of the second computing device 212 such that the touch sensor/screen of the second computing device can be utilized in detecting the release event. In some embodiments, a release event can be a dropping motion, a throwing (e.g., tossing) motion, a flicking motion, a pointing motion, a tapping gesture, a pressing gesture, or other similar gestures/movements detectable by the second computing device 212 (e.g., via the second image capture component 214 and/or touch sensor/screen).

In some embodiments, upon the release event, the association between the graphical object 206 and the portion of the hand 210 can end. In some embodiments, the association can continue after the release event and can be ended by a different type of user hand gesture, command, or other interaction. In some embodiments, a first association can be terminated when a second association occurs.

In some embodiments, the graphical object 206 can stabilize and remain stationary on the display screen of the second computing device 212, as shown in FIG. 2E, upon the release event. Moreover, the data on the first computing device 202 represented by the graphical object 206 can be transferred from the first computing device 202 to the second computing device 212. As such, the moving of the graphical object 206 from the screen of the first computing device 202 to that of the second computing device 212 represents a transfer of the data on the first computing device 202 represented by the graphical object 206 to the second computing device 212.

In some embodiments, the first computing device 202 and the second computing device 204 can communicate with one another to enable the various features of the present disclosure. The first and second computing devices can communicate with one another directly (e.g., via Bluetooth, radio frequency identification RFID, near field communication NFC, WiFi, infrared, etc.) or via a proxy and/or server (e.g., Web server, cellular network 2G/3G/4G server, etc.). For example, an application can be executed on the first computing device 202 in preparation for transferring information to the second computing device 212. Similarly, an application can be executed on the second computing device 212 in preparation for the information transfer. The position tracking and the attach/release event detection can be initialized by the applications in preparation for data transfer. Furthermore, the applications can allow the first and second computing devices to establish a connection to communicate with one another. For example, the applications can enable the first and second computing devices to communicate tracking information for the position of the portion of the hand 210 of the user 208, the position of the graphical object 206 on the display screen of the first computing device 202 and/or that of the second computing device 212, as well as information about one device's position (e.g., location, orientation) relative to the other's. In addition, the applications can enable the sharing of information between the devices about attach/release events and user positions/movements, and they can also enable the transfer of the data represented by the graphical object 206.

In some embodiments, the first and second computing devices can communicate with one another via a proxy/server (e.g., via a web server on the Internet, via a cellular server on a 2G/3G/4G network, etc.). Each of the applications executed on the first and second computing devices can enable each device to establish a connection with the proxy/server. In some embodiments, the two computing devices can communicate with one another via the proxy/server. For example, the applications can share information about the position of the portion of the hand 210, about the graphical object 206, about attach/release events, and/or other information via the proxy/server. For example, computing devices can communicate with one another to determine which device is the first computing device and/or which is the second computing device when there are multiple computing devices. In another example, the first and second computing devices can communicate with each other to collaboratively show (portions of) a single graphical object 206 on the two computing devices, as shown in FIG. 2D. Moreover, the applications can enable the transfer of the data represented by the graphical object 206. In some embodiments, each of the two computing devices can communicate with the proxy/server and need not communicate with one another. For example, each of the computing devices can communicate with the proxy/server and the proxy/server can determine what information to send back to each of the devices. In some embodiments, the data represented by the graphical object 206 to be transferred can be stored on the proxy/server until the second computing device desires to receive the data.

Figure 3:
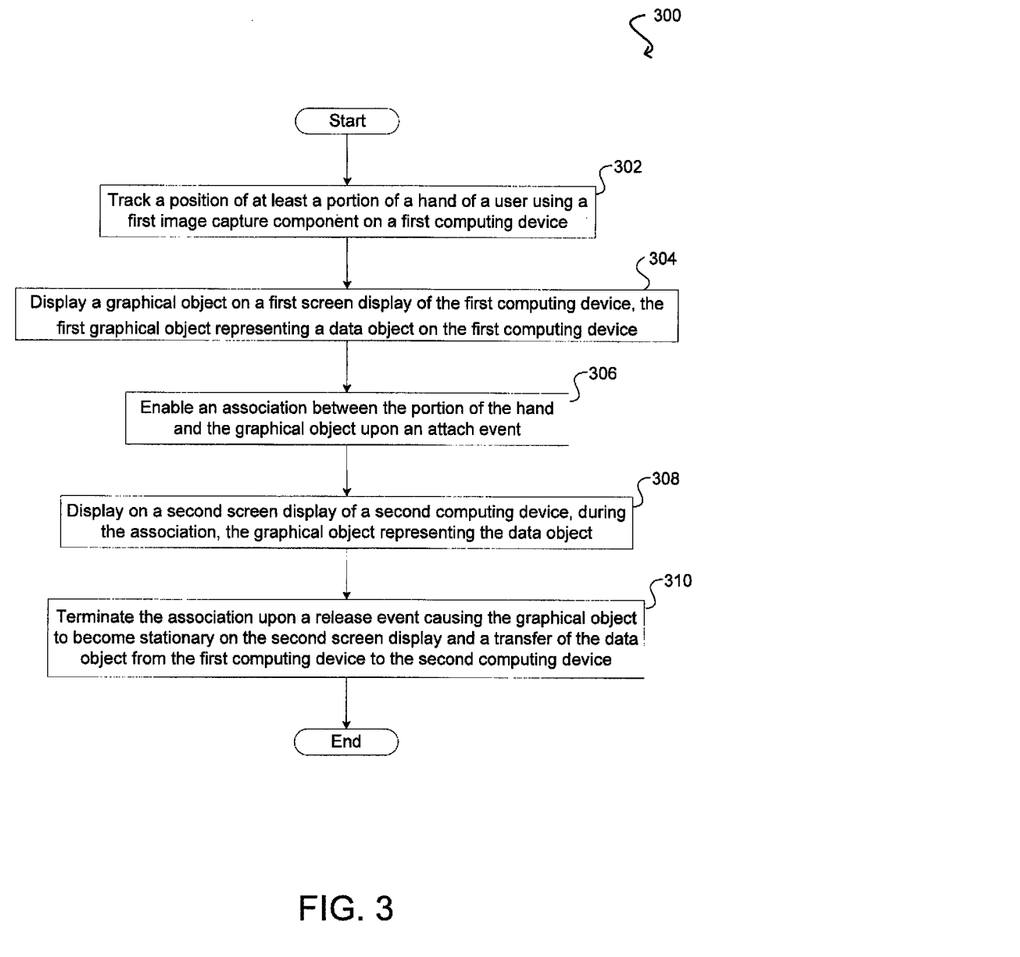
FIG. 3 illustrates an example method embodiment for transferring information among devices using cameras.

FIG. 3 illustrates an example method embodiment 300 for transferring information among devices using cameras. It should be understood that there can be additional, fewer, or alternative steps performed in similar or alternative orders, or in parallel, within the scope of the various embodiments unless otherwise stated. The example method embodiment 300 can track a position of at least a portion of a hand of a user of a first computing device, at step 302. This can be done using a first image capture component on the first computing device. For example, one or more cameras on the first computing device can be used to track the position (e.g., location, movements, etc.) of the portion of the user's hand.

At step 304, the example method embodiment 300 can display a graphical object on a first screen display of the first computing device. The graphical object can represent a data object on the first computing device. For example, the method 300 can display an icon on the display screen of the first computing device. The data object can include, but is not limited to, an application, file, contact information, and/or other various types of data. For example, the icon can be a representation of a mobile app, a picture, a video, an audio file, a document, an electronic book, etc. In some embodiments, the icon can represent a state of the device, network connection data, a configuration file, user preference data, a uniform resource locator (URL), information related to making a payment, etc.

The method embodiment, at step 306, can enable an association between the portion of the hand and the graphical object upon an attach event. The association between the portion of the hand and the graphical object can enable movements of the portion of the hand that are viewable/trackable using the first image capture component to cause corresponding movements of the graphical object. For example, upon an attach event such as a pinching or tapping of the graphical object, one or more fingers of the user can become associated with the graphical object. If the user moves his/her hand (and thus the one or more fingers), then the graphical object will move on the first display screen correspondingly to the movement of the user's hand. If, for example, the user moves his/her hand into an area that is not viewable/trackable using the first image capture component, then the graphical object can become stationary (e.g., near the edge of the screen) or it can move correspondingly off the display screen.

During the association, the example method 300 can display the graphical object on a second screen display of a second computing device when the position of the portion of the hand becomes viewable/trackable using a second image capture component on the second computing device, at step 308. During the association, a movement of the portion of the hand that is viewable/trackable using the second image capture component can cause a corresponding movement of the graphical object on the second screen display.

At step 310, the method 300 can terminate the association upon a release event such as a separating of pinched fingers and/or a tapping on the second display screen. The termination of the association upon the release event can cause the graphical object to stabilize and become stationary on the second screen display. The termination of the association upon the release event can also cause the data object (or information associated with the data object) to be transferred from the first computing device to the second computing device.

Figure 4:
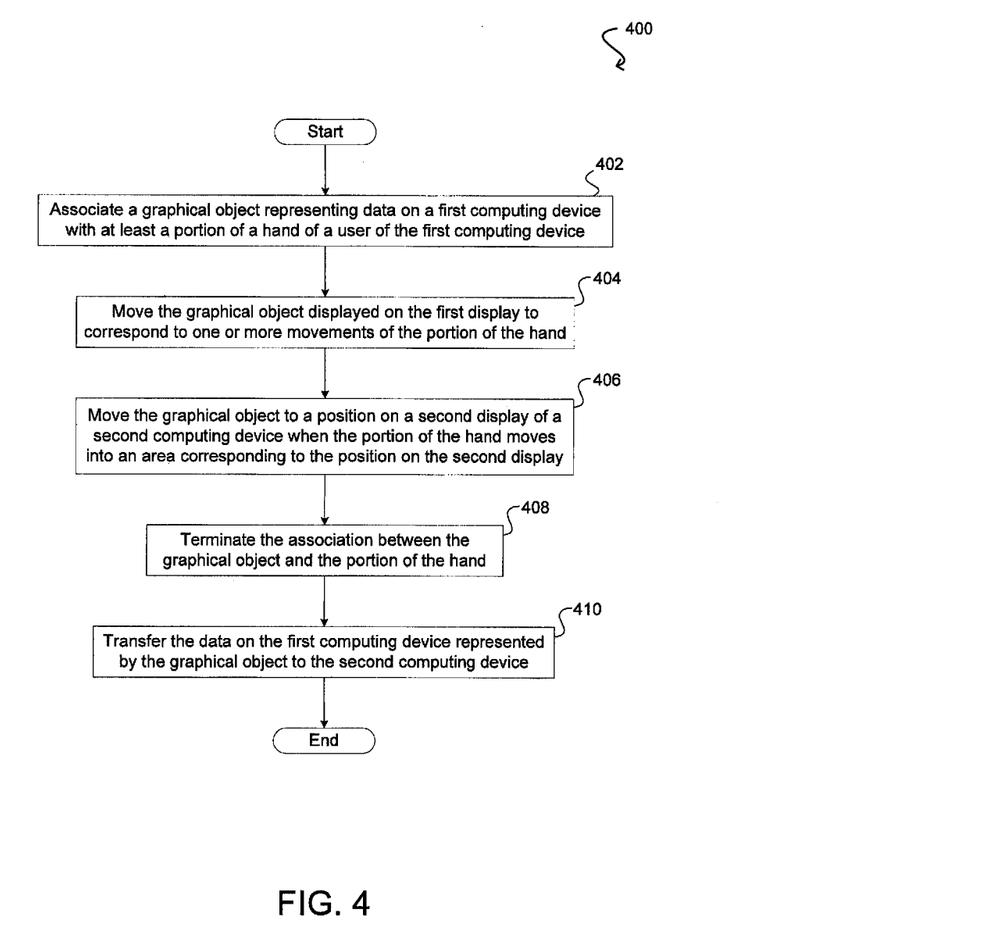
FIG. 4 illustrates an example method embodiment for transferring information among devices using cameras.

FIG. 4 illustrates an example method embodiment 400 for transferring information among devices using cameras. Again, it should be understood that there can be additional, fewer, or alternative steps performed in similar or alternative orders, or in parallel, within the scope of the various embodiments unless otherwise stated. The example method embodiment 400 can start with associating a graphical object representing data on a first computing device with at least a portion of a hand of a user of the first computing device, at step 402. The graphical object can be initially displayed on a first display of the first computing device. For example, an icon for a file on the screen of the first computing device can be associated with one or more fingers of the user's hand. The association can be initiated when an attach event occurs.

At step 404, the example method 400 can move, while the graphical object is associated with the portion of the hand, the graphical object displayed on the first display to correspond to one or more movements of the portion of the hand. For example, during the association between the icon for the file and the user's finger(s), the method 400 can move the icon to correspond to movements of the user's hand (and his/her finger(s)). In some embodiments, step 404 can be performed based at least in part upon using a first image capture component on the first computing device to view (and track) the portion of the hand. For example, the user's hand (e.g., one or more fingers) can be viewed and its movements tracked using a camera on the first computing device. Using the viewed/tracked information, the icon for the file can be moved to correspond to the viewed/tracked movements of the user's hand/finger(s).

If the portion of the hand has moved into a position that does not correspond to a position on the first display of the first computing device, then the graphical object can be moved off the first display of the first computing device. In some embodiments, the graphical object can remain stationary near the edge of the display of the computing device when the portion of the hand has moved into a position that does not correspond to a position on the display of the computing device.

At step 406, the method 400 can move the graphical object to a position on a second display of a second computing device when the portion of the hand moves into an area corresponding to the position on the second display. Continuing with the previous example, when the user's hand and finger(s) move into an area (e.g., an area directly above the upper left corner of the second display) that corresponds to a position on the second display (e.g., the upper left corner of the second display), the method can correspondingly move the graphical object from the first display of the first computing device to the position (e.g., the left upper corner) on the second display of the second computing device.

In some embodiments, step 406 can be performed based at least in part upon using a second image capture component on the second computing device to view/track the portion of the user's hand and its movement(s). In some embodiments, the field of view of each of the first and second image capture components can overlap. In some embodiments, the first and second image capture components can also share information such that the quality and/or accuracy of the viewing/tracking of the hand position can be improved. In some embodiments, when the graphical object is moved off the display of the first and/or second computing device, there can be a timer countdown such that the method 400 can be cancelled if the graphical object is not moved onto the display of the first and/or second computing device within a specified time limit.

At step 408, the example method 400 can terminate the association between the graphical object and the portion of the hand. The terminating of the association can cause the graphical object to become stationary on the second display of the second computing device. Step 408 can be performed when a release event occurs, such as a separation of pinched fingers and/or a tap on the second display.

At step 410, the method 400 can transfer the data on the first computing device represented by the graphical object to the second computing device. Step 410 can also be performed upon the occurrence of a release event. The transfer of the data can occur via a proxy/server or via direct communication between the first and second computing devices.

In some embodiments, the user can attach and release (e.g., copy/cut and paste, drag and drop) the graphical object from the first computing device onto an application on the second computing device to trigger an auto play of the data represented by the graphical object using the application. For example, if an icon represented a music file on the first computing device, the user can drag and drop the icon onto a media playing application on the second computing device. In some embodiments, the music file will be copied onto the second computing device and be automatically played by the media playing application. In some embodiments, the music file will be moved into the second computing device and be automatically played by the media playing application. In some embodiments, the music file can be streamed (e.g., but not copied due to concerns involving copyright, digital rights, etc.) to the second computing device to be automatically played by the media playing application. In some embodiments, there can be one or more prompts asking what the user wants to do with the transferred data.

In some embodiments, the various features of the present disclosure enable the user to be a virtual clipboard, virtual data store, virtual thumb/flash drive, etc. In some embodiments, the user can trigger an attach event (e.g., pinching an icon, tapping an icon, etc.), attach the data associated with the graphical object/icon to his/her hand (and thus to his/her person), and carry the data with himself/herself over longer physical distances or longer periods of time. For example, the user can pinch a file on his/her computer at work to trigger an attach event such that the file is attached to and/or associated with the user. After work, the user can go home with the file associated with and/or virtually attached to his/her fingers (e.g., to his/her person). At home, the user can release the file onto his/her home computer causing the file to be transferred from his/her work computer to his/her home computer. In some embodiments, biometric identification can be utilized to authenticate and/or authorize the user to perform one or more operations on a computing device(s). In some embodiments, security measures, including utilizing biometric recognition such as facial, fingerprint, retina, voice, palm (e.g., palm vein) recognition, can be taken to ensure that only desired users can perform attach/release events on the computing device(s).

In some embodiments, multiple data objects can be attached to the user. For example, the user can attached a plurality of files to his/her person; upon the release event, there can be a list showing the files currently associated with the user; and the user can choose while file(s) to transfer. In some embodiments, the user can attach a different file to each of his/her fingers and release a file using the appropriate/respective finger.

In some embodiments, the attached data can be dynamically updated. For example, if the user attached a file from his/her work computer and a colleague subsequently revised/altered the file, the user can have the option to transfer to his/her home computer either the newer version of the file or the older (currently associated) one.

In some embodiments, the data on the first computing device can be a sound file captured by an audio capture component (e.g., microphone) on the first computing device and attached to the user when the he/she performs a sound capture gesture (attach event) detectable by the first image capture component. For example, the user can move his/her hand into a shape resembling a telephone receiver such that the first image capture component on the first computing device can detect the hand gesture. The first computing device can then utilize its microphone to record audio. When the user makes a telephone gesture (release event) detectable by the second computing device, the recorded audio can be transferred from the first computing device to the second computing device.

In some embodiments, the data on the first computing device can be location information. For example, the user can perform a location capture gesture (e.g., pointing to the ground) such that the first computing device records the current location information (e.g., address, GPS coordinates, date, time, etc.). Upon a release event, the current location data can be transferred to the second computing device.

In some embodiments, upon transfer of the information, the information on the first computing device can be deleted. For example, in a "cut and paste" operation, when (a copy of) a data object is transferred (e.g., "pasted") from the first computing device onto the second computing device, the instance of the data object on the first computing device can be automatically deleted (e.g., "cut").

In some embodiments, the user can perform a delete gesture to dissociate the data with his/her person (e.g., hand). The delete gesture can cause the dissociation (and cancellation of the data transfer) when the first and/or second image capture component detect the delete gesture. For example, a delete gesture can be a motion resembling a wiping of the user's hands.

Furthermore, various embodiments consistent with the present disclosure can be implemented for augmented reality environments. For example, utilizing object recognition technology, the data on the first computing device can be information about one or more items/objects in reality that are recognized by the first computing device (e.g., using the first image capture component). In some embodiments, real objects such as books, groceries, consumer products, and other items can be recognized by the first computing device. When the user initiates an attach event, information about the one or more items/objects can be attached to his/her hand, person, and/or shopping cart. The information about the objects can be transferred to a second computing device upon a release event. In some embodiments, the first computing device can be a pair of glasses with computational/processing power. For example, the first image capture component on the computing glasses can view at least a portion of what the user sees. When the user looks at an object/item, the computing glasses can use object recognition technology to identify the object. To initiate an attach event, the user can grab the object or pretend to grab at the object; the grabbing gesture can be in the field of view of first image capture component so that the computing glasses can detect the attach event. The user can trigger a release event at the second computing device (e.g., checkout counter, web server, etc.) to initiate the transfer of information about the object to the second computing device. In some embodiments, a checkout process for purchasing the object can be initiated in response to the release event.

Figure 5:
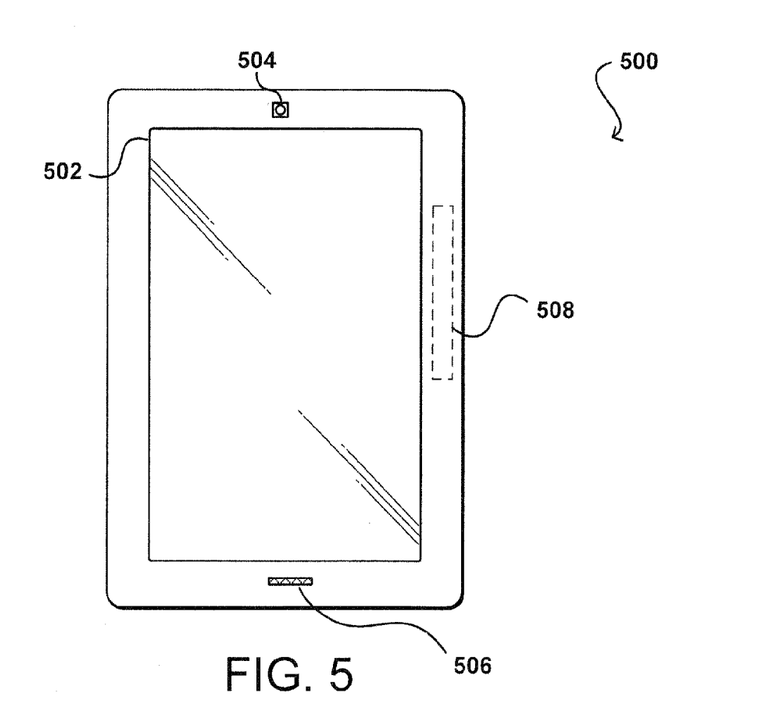
FIG. 5 illustrates an example device that can be used to implement aspects of the various embodiments.

FIG. 5 illustrates an example electronic user device 500 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 500 has a display screen 502 on the front side, which under normal operation will display information to a user facing the display screen (e.g., on the same side of the computing device as the display screen). The computing device in this example includes at least one camera 504 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 500 also includes at least one microphone 506 or other audio capture device capable of capturing audio data, such as words or commands spoken by a user of the device. In this example, a microphone 506 is placed on the same side of the device as the display screen 502, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 500 also includes at least one orientation sensor 508, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 6:
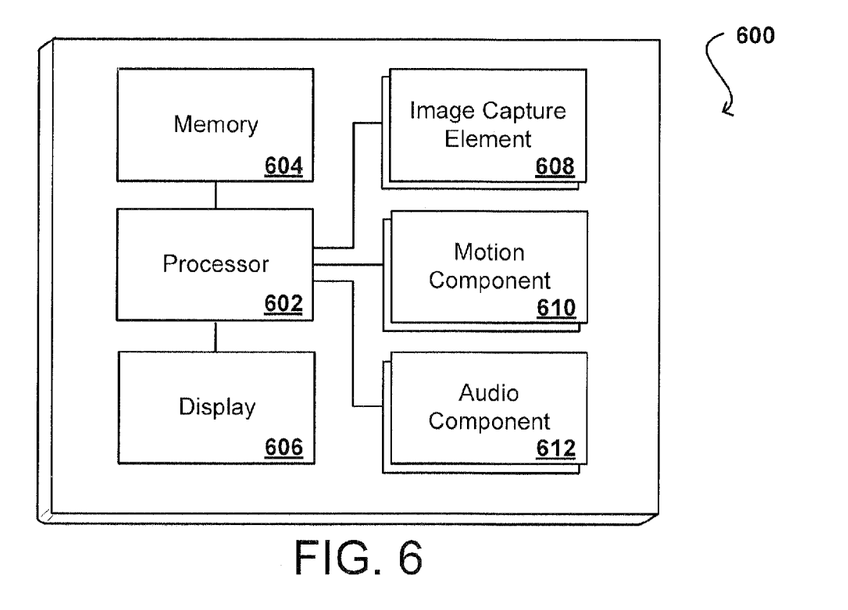
FIG. 6 illustrates example components of a client device such as that illustrated in FIG. 5.

FIG. 6 illustrates a logical arrangement of a set of general components of an example computing device 600 such as the device 500 described with respect to FIG. 5. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one image capture element 608 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 612, such as a mono or stereo microphone or microphone array, operable to capture audio information from at least one primary direction. A microphone can be a uni- or omni-directional microphone as known for such devices.

In some embodiments, the computing device 600 of FIG. 6 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 600 also can include at least one orientation or motion sensor 610. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 602, whereby the device can perform any of a number of actions described or suggested herein.

As an example, a computing device such as that described with respect to FIG. 5 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 7:
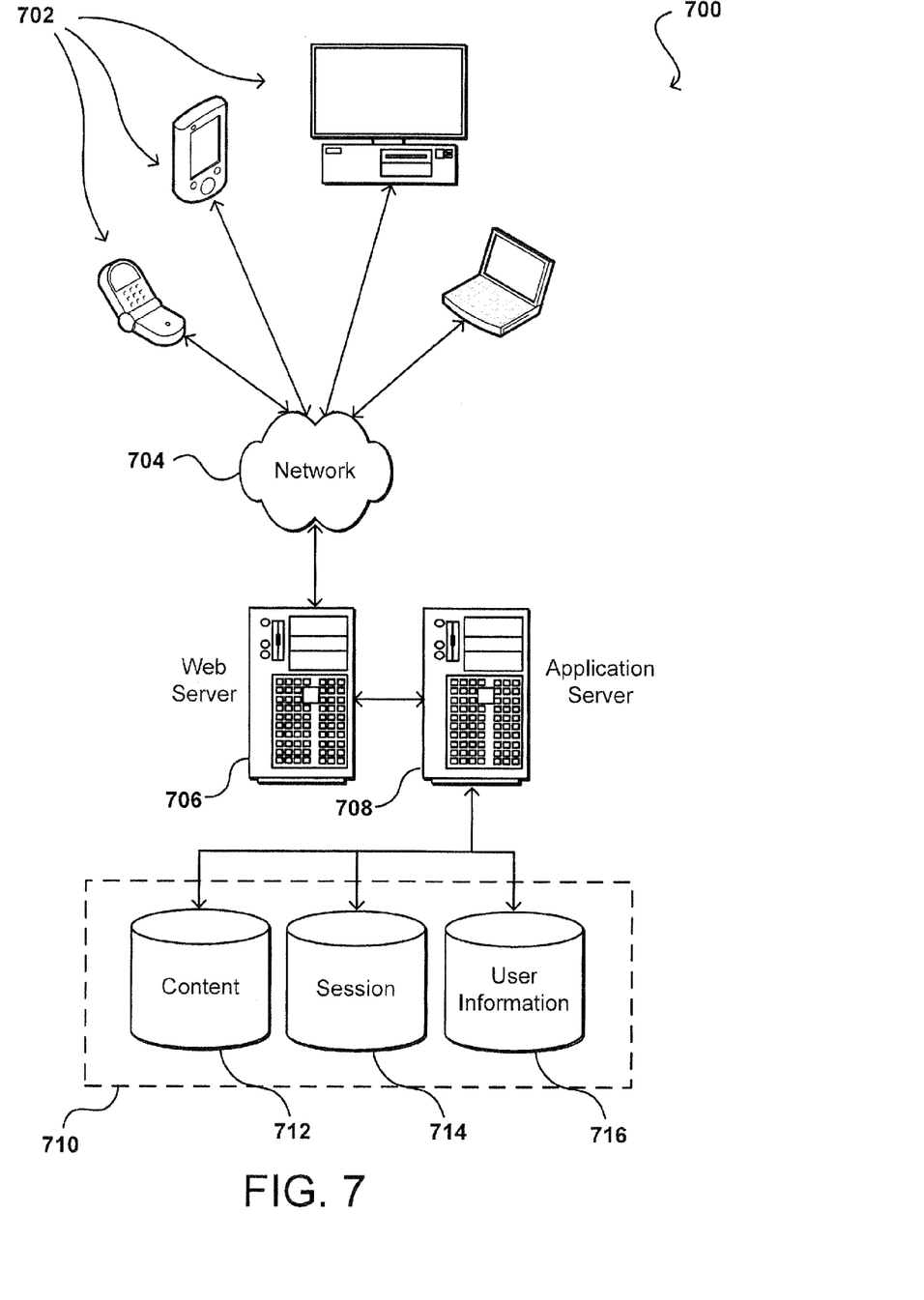
FIG. 7 illustrates an environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 702. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
   determining a position of an object using a sensor of a first computing device;
   detecting an attach event including at least a portion of a first gesture performed by the object within a time period that the object is not in contact with the first computing device;
   associating data for a graphical object with the object;
   displaying the graphical object at a position, associated with a location of the attach event, on a display screen of the first computing device;
   receiving a signal from a second computing device identifying a release event including at least a portion of a second gesture performed at the second computing device;
   sending a copy of the data corresponding to the graphical object to the second computing device; and
   dissociating the data for the graphical object and the object.

2. The computer-implemented method of claim 1, further comprising:
   associating the data occurs in response to the attach event;
   dissociating the data in response to the release event; and
   sending the copy of the data in response to the release event.

3. The computer-implemented method of claim 1, further comprising:
   detecting at least one of a pinching gesture, a first tapping gesture, a first pressing gesture, a first grabbing gesture, or a first pointing gesture, with respect to the graphical object, as the attach event; and
   identifying at least one of an unpinching gesture, a second tapping gesture, a second pressing gesture, a throwing gesture, a dropping gesture, or a second pointing gesture performed on the second computing device as the release event.

4. The computer-implemented method of claim 1, further comprising:
   receiving the signal from one or more of a proxy or a server; and
   sending the copy of the data to the one or more of the proxy or the server.

5. The computer-implemented method of claim 1, wherein the data resides on the first computing device and comprises at least one of a document, a picture, a video, an audio clip, network connection data, a configuration file, user preference data, location data, or software.

6. The computer-implemented method of claim 1, further comprising:
   authorizing actions to be performed on the first computing device based on at least one of facial recognition, fingerprint recognition, retina recognition, palm recognition, or voice recognition.

7. The computer-implemented method of claim 1, further comprising:
   associating information about an item in reality, identified utilizing item recognition, with the object.

8. The computer-implemented method of claim 7, further comprising:
   receiving the signal from the second computing device located at a point of sale; and
   initiating a checkout process for purchasing the item in reality in response to identifying the release event.

9. A computer-implemented method comprising:
   receiving on a second computing device a request to accept data, the request being initiated from a first computing device and identifying an attach event including at least a portion of a first gesture detected by the first computing device;
   determining a position of an object using a sensor of the second computing device;
   detecting a release event including at least a portion of a second gesture performed by the object within a time period that the object is not in contact with the second computing device;
   sending a signal to the first computing device identifying detection of the release event; and
   receiving from the first computing device a copy of the data.

10. The computer-implemented method of claim 9, further comprising:
    executing an application on the second computing device to utilize the copy of the data.

11. The computer-implemented method of claim 9, further comprising:
    receiving the copy of the data as a streamed media file; and
    executing a media playing application to play the streamed media file.

12. The computer-implemented method of claim 9, further comprising:
    detecting at least one of an unpinching gesture, a tapping gesture, a pressing gesture, a throwing gesture, a dropping gesture, or a pointing gesture as the release event.

13. The computer-implemented method of claim 9, further comprising:
    identifying at least one of a pinching gesture, a tapping gesture, a pressing gesture, a grabbing gesture, or a pointing gesture as the attach event.

14. The computer-implemented method of claim 9, wherein the data resides on the first computing device and comprises at least one of a document, a picture, a video, an audio clip, network connection data, a configuration file, user preference data, location data, or software.

15. A computing device comprising:
    a sensor;
    a display screen;
    a processor; and
    a memory device including instructions that, when executed by the processor, cause the computing device to:
        determine a position of an object using the sensor;
        detect an attach event including at least a portion of a first gesture performed by the object within a time period that the object is not in contact with the computing device;
        associate data for a graphical object with the object;
        display the graphical object being at a position, associated with a location of the attach event, on the display screen;
        receive a signal from a second computing device identifying a release event including at least a portion of a second gesture performed at the second computing device;
        send a copy of the data for the graphical object to the second computing device; and dissociate the data for the graphical object and the object.

16. The computing device of claim 15, wherein the instructions, when executed by the processor, further cause the computing device to:
associate the data in response to the attach event;
dissociate the data in response to the release event; and
send the copy of the data in response to the release event.

17. The computing device of claim 15, wherein the instructions, when executed by the processor, further cause the computing device to:
detect at least one of a pinching gesture, a tapping gesture, a pressing gesture, a grabbing gesture, or a pointing gesture, with respect to the graphical object as the attach event.

18. The computing device of claim 15, wherein the instructions, when executed by the processor, further cause the computing device to:
identify at least one of an unpinching gesture, a tapping gesture, a pressing gesture, a throwing gesture, a dropping gesture, or a pointing gesture performed on the second computing device as the release event.

19. The computing device of claim 15, further comprising:
a biometric sensor including at least one of a facial recognition sensor, a fingerprint scanner, a retina scanner, a palm recognizer, or a voice recognizer, the biometric sensor communicating with the processor to authorize actions to be performed on the computing device.

20. The computing device of claim 15, wherein the instructions when executed by the processor, cause the computing device to:
receive the signal from one or more of a proxy or a server; and
send the copy to the one or more of the proxy or the server.

* * * * *